United States Patent [19]

Morita et al.

[11] Patent Number: 4,651,235
[45] Date of Patent: Mar. 17, 1987

[54] MAGNETIC DATA TRANSFER APPARATUS HAVING A COMBINED READ/WRITE HEAD

[75] Inventors: Tsutomu Morita, Musashino; Shozo Toma, Kokubunji; Yoshiaki Sakai, Higashikurume, all of Japan

[73] Assignee: Teac Corporation, Tokyo, Japan

[21] Appl. No.: 700,642

[22] Filed: Feb. 12, 1985

[30] Foreign Application Priority Data

Feb. 18, 1984 [JP] Japan .................................. 59-29117

[51] Int. Cl.[4] .............................................. G11B 5/09
[52] U.S. Cl. .................................................. 360/46
[58] Field of Search ......................... 360/45, 46, 68, 61

[56] References Cited

U.S. PATENT DOCUMENTS

| | | | |
|---|---|---|---|
| 3,505,662 | 4/1970 | Hibner | 360/46 |
| 3,618,119 | 11/1971 | Rodriquez | 360/46 |
| 4,249,219 | 2/1981 | Aoi et al. | 360/46 |
| 4,477,846 | 10/1984 | Cottrell et al. | 360/46 |
| 4,525,753 | 6/1985 | Shimeki et al. | 360/46 |

OTHER PUBLICATIONS

"Practical Introduction to Floppy Disk Drives" (6th ed. 1982) (First edition published Jul. 10, 1979), p. 31.

Primary Examiner—Vincent P. Canney
Attorney, Agent, or Firm—Woodcock Washburn Kurtz Mackiewicz & Norris

[57] ABSTRACT

A magnetic disk drive is disclosed which has a write circuit for alternately exciting the a pair of coils of a read/write head in response to a two level write data signal when a write gate signal is in a prescribed state, thereby causing the coils to create magnetic fluxes in the opposite directions in the core. The write circuit excites a different one of the coils of the read/write head each time the write data signal changes in level from a predetermined one to the other. A final excitation circuit is provided for delaying, for example, the write gate signal for a preassigned length of time in order to cause the write circuit to excite a preselected one of the coils of the read/write head in a prescribed direction upon completion of the writing of the write data signal. Consequently, the residual magnetism of the read/write head is of one and the same orientation upon completion of writing, making possible the accurate detection of the peaks of the reproduced waveform at the time of subsequent reading.

6 Claims, 5 Drawing Figures

MAGNETIC DATA TRANSFER APPARATUS HAVING A COMBINED READ/WRITE HEAD

BACKGROUND OF THE INVENTION

Our invention relates to an apparatus for the transfer of digital data with a record medium such as a flexible magnetic disk, and more specifically to such an apparatus having a combined read/write head for recording digital data on, and recovering the same from, the record medium.

A magnetic read/write head for digital data transfer with a magnetic disk is known which has a pair of coils wound around a magnetic core having a read/write gap. Connected to the coils of the read/write head are a write circuit for electromagnetically causing the head to record desired data on the disk and a read circuit for processing the data read from the disk by the head. The write circuit alternately excites the head coils in response to a digital write data signal, causing the coils to produce magnetic fluxes oriented in the opposite directions in the core.

Since the write data signal in a binary code may be either "0" or "1" at the end of writing, the residual magnetism of the read/write head has also been oriented in either of the opposite directions according to the prior art. Such indefinite direction of the residual magnetism upon completion of writing is objectionable because, at the time of subsequent reading, it can adversely affect the detection of the peaks of the output waveform of the read/write head, possibly making difficult the accurate reproduction of the original data by the read circuit.

SUMMARY OF THE INVENTION

We have hereby found a solution to the problem of how to make the direction of residual magnetism constant at the end of the writing of digital data in a magnetic data transfer apparatus of the kind specified, for the accurate recovery of the recorded data.

Our invention may be briefly summarized as an apparatus for the transfer of digital data with a record medium such as a magnetic disk, with the digital data to be written on the record medium being supplied in the form of a two level write data signal. The apparatus includes a read/write head for writing digital data on, and reading the same from, the record medium, the read/write head comprising a magnetic core with a read/write gap, and first and second coils wound around the core to create therein magnetic fluxes in opposite directions. A write circuit is provided for alternately exciting the first and second coils of the read/write head in response to the two level write data signal, thereby causing the coils to create magnetic fluxes in the opposite directions in the core. The write circuit is adapted to excite a different one of the first and second coils of the read/write head each time the write data signal changes in level from a predetermined one to the other. Also included is a final excitation circuit connected to the write circuit to cause the same, upon completion of the writing of the write data signal, to excite a preselected one of the first and second coils of the read/write head in a prescribed direction.

In a preferred embodiment, the write circuit is allowed to excite the coils of the read/write head in response to the write data signal only when a write gate signal is in a prescribed state, as is customary with this type of magnetic data transfer apparatus. The final excitation circuit can take the form of a delay circuit for extending the prescribed state of the write gate signal for a definite length of time.

As the preselected one of the read/write head coils is energized as above upon completion of writing, the resulting residual magnetism is oriented in one and the same direction. Accordingly, at the time of subsequent reading, it is easy to compensate for the shifting of the peaks of the reproduced waveform due to the residual magnetism and hence to accurately detect the peaks for the provision of digital read data as an exact replica of the write data.

The above and other features and advantages of our invention and the manner of realizing them will become more apparent, and the invention itself will best be understood, from a study of the following description and appended claims, with reference had to the attached drawings showing some preferred embodiments of our invention.

DESCRIPTION OF THE PREFERRED EMBODIMENTS

Figure 1:
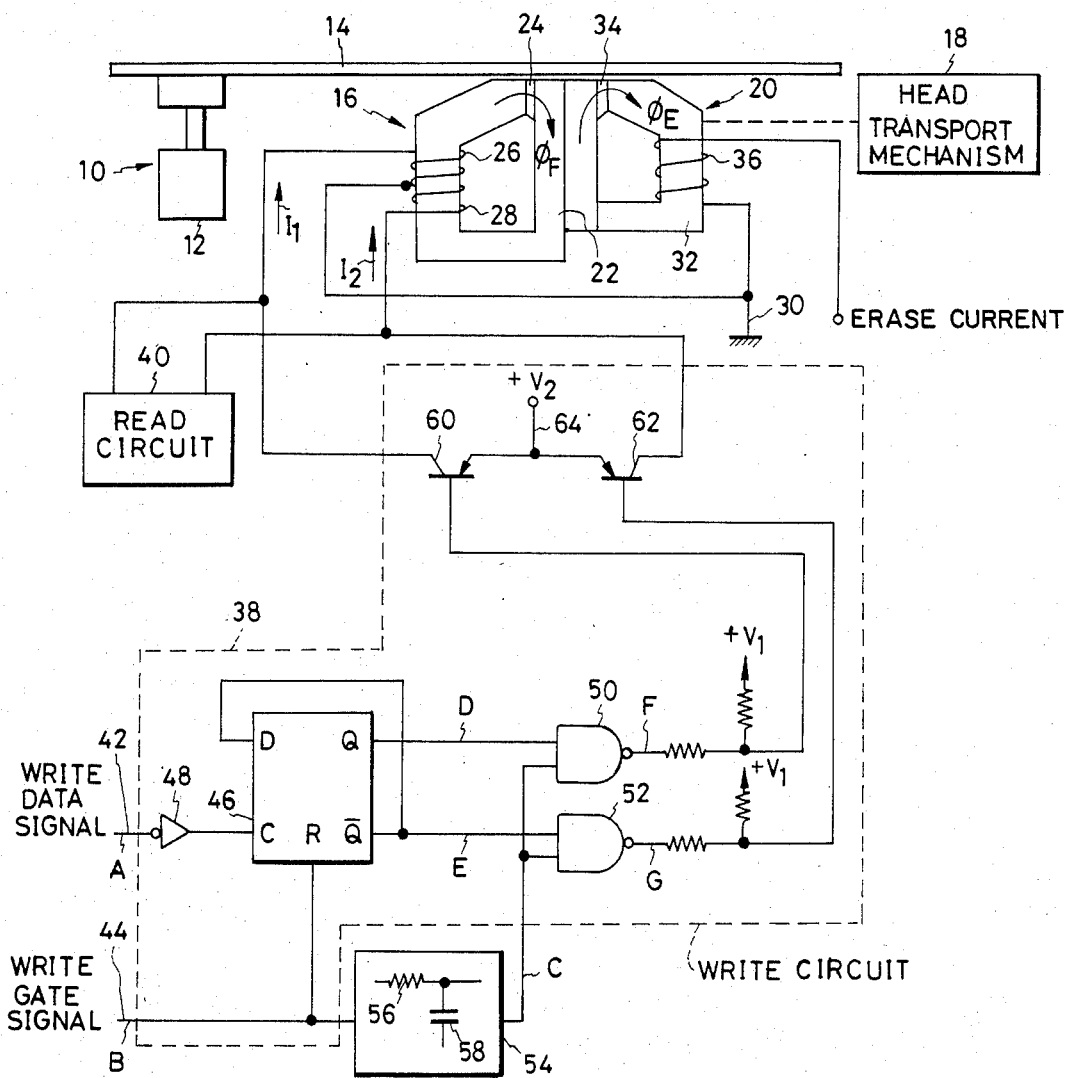
FIG. 1 is a block diagram of a magnetic disk drive embodying the principles of our invention.

We will now describe the data transfer apparatus of our invention as embodied in the magnetic disk drive shown in FIG. 1. The exemplified disk drive has disk drive mechanism 10 including a disk drive motor 12 for imparting rotation to a magnetic disk 14. A magnetic read/write head 16 is shown disposed under the magnetic disk 14 for recording and reproducing digital data on and from the same. As is well known, a head transport mechanism 18 is coupled to the read/write head 16 to transport the same radially of the magnetic disk 14, enabling the head to access the usual tracks on the disk.

Figure 2:
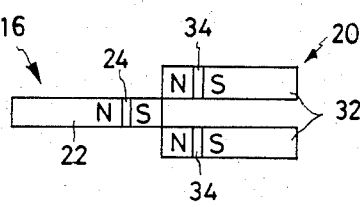
FIG. 2 is a schematic plan view of the magnetic read/write head in the disk drive of FIG. 1.

As will be seen also from FIG. 2, we have shown the read/write head 16 as being of what is known as the "tunnel erase head" configuration, including a pair of erase heads 20 on its opposite sides for trimming the track traced by the read/write head. The read/write head 16 includes a magnetic core 22 having a read/write gap 24, and first 26 and second 28 coils wound around the core. The two coils 26 and 28 are both grounded by way of a common line 300 and formed from a single winding 27 which is divided, notionally, into the pair of read/write coils 26 and 28 by the center tapping thereof. Each erase head 20 likewise includes a magnetic core 32 having an erase gap 34, and a coil 36 wound around the core 32. One extremity of each erase head coil 36 is grounded via the common line 30.

Connected to the pair of read/write head coils 26 and 28 are a write circuit 38 and a read circuit 40. The read circuit 40 is shown simply as a block since it can be of conventional design and bears no direct pertinence to our invention. The write circuit 38 functions to excites the read/write coils 26 and 28 in response to a digital, two level write data signal representative of data to be written on the magnetic disk 14, and to a write gate signal which determines the time during which the data can be written. The write data signal is supplied by way of an input line 42, and the write gate signal by way of an input line 44.

The write circuit 38 includes a D flip flop 46 having a "C" (clock) input connected to the input line 42 via a NOT circuit 48, and an "R" (reset) input connected to the other input line 44. The "Q" and "Q̄" outputs of the flip flop 46 are connected to first 50 and second 52 NAND gates, respectively, and the "Q̄" output is further connected to the "D" input of the flip flop.

Connected between the other inputs of the NAND gates 50 and 52 and the write gate signal input line 44 is a final excitation circuit 54 constituting a feature of our invention. The final excitation circuit 54 is, in essence, a delay circuit of known design comprising a resistor 56 and a capacitor 58. The final excitation circuit 54 functions to delay the write gate signal for a preassigned length of time, prior to delivery to the NAND gates 50 and 52. The delay time should be not less than one third the minimum data pulse spacing. If the minimum data pulse spacing is known to be eight microseconds, for example, then the delay time may be foru microseconds or so.

The NAND gates 50 and 52 have their outputs connected to the bases of first 60 and second 62 switching transistors of the PNP type, respectively, so that these transistors conduct when the outputs from the NAND gates go low. The first transistor 60 is connected between a direct current supply terminal 64 and one extremity of the first coil 26 of the read/write head 16, whereas the second transistor 62 is connected between the supply terminal 64 and one extremity of the second read/write head coil 28, the other extremities of the coils 26 and 28 being grounded. Thus the read/write head coils 26 and 28 are energized only during the conducting periods of the switching transistors 60 and 62, respectively.

OPERATION

We will refer to the waveforms (A) through (G) of FIG. 3 for the operational description of the magnetic disk drive constructed as above described with reference to FIGS. 1 and 2. In order to facilitate understanding, we have indicated in FIG. 1 the lines where the waveforms (A) through (G) appear, by the same capitals.

Figure 3:
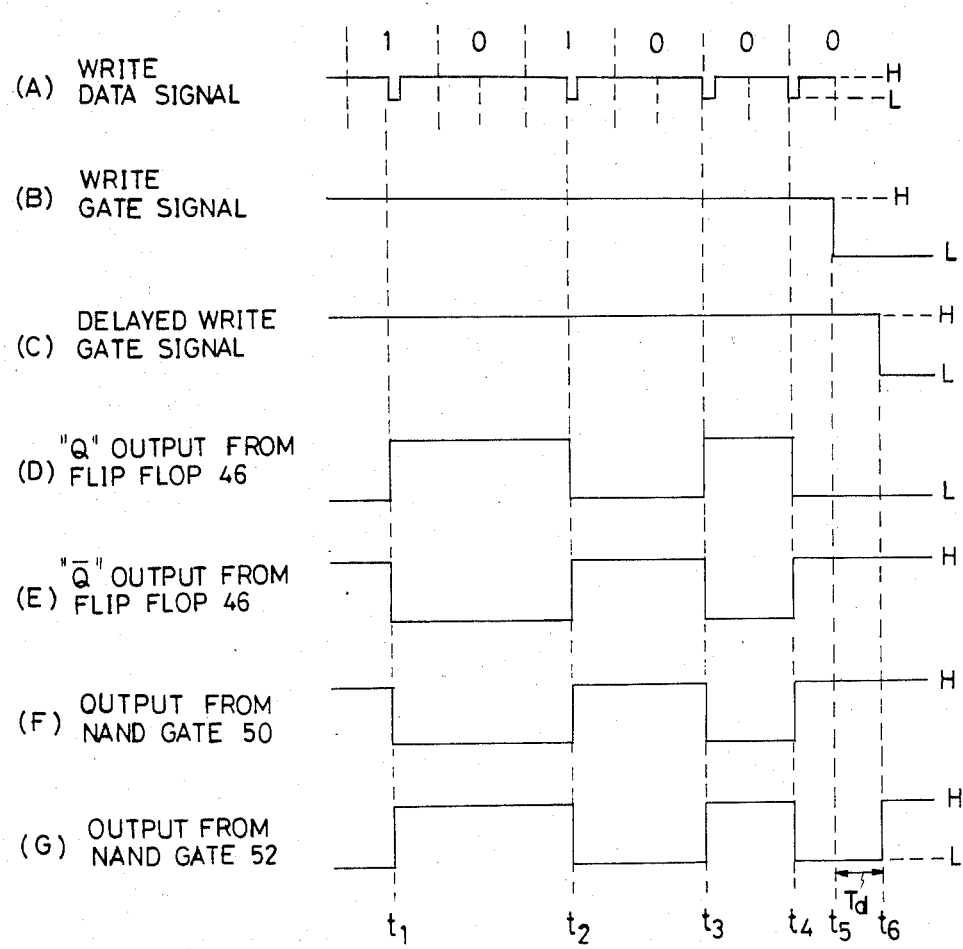
FIG. 3, consisting of (A)-(G), is a diagram of waveforms appearing in various parts of the disk drive of FIG. 1 and useful in explaining its operation.

Given at (A) in FIG. 3 is the waveform of a two level (designated H and L) write data signal composed of data (e.g. "101000") to be written by modified frequency modulation and of clock pulses. Supplied by way of the input line 42 and inverted by the NOT circuit 48, the write data signal enters the flip flop 46 of the write circuit 38. The outputs from the flip flop 46 change between its two levels or states each time the write data signal changes from one level (e.g. high) to the other (e.g. low). Thus, as the exemplified write data signal goes low at moments t1, t2, t3, and t4 in time, the outputs from the flip flop 46 change in level at the same moments as at (D) and (E) in FIG. 3.

At (B) in FIG. 3 is plotted the write gate signal supplied by way of the input line 44 to the reset input of the flip flop 46 and to the delay circuit 54. The write gate signal remains high throughout the writing period and is shown to go low at a moment t5 upon completion of writing. The delay circiut 54 delays the write gate signal for the period Td, so that the write gate signal as applied to the NAND gates 50 and 52 remains high until a moment t6, as at (C) in FIG. 3.

As long as the write gate signal remains high, the outputs from the NAND gates 50 and 52 change in response to the "Q" and "Q̄" outputs, respectively, from the flip flop 46 as at (F) and (G) in FIG. 3. Thus, until the moment t6, the output from either of the NAND gates 50 and 52 goes high as the output from the other goes low, and vice versa, as dictated by the write data signal.

As the pair of NAND gates 50 and 52 oppositely go high and low as above, the pair of switching transistors 60 and 62 alternately become conductive and nonconductive. Upon conduction of the first transistor 60, for example, a current I1 will flow through the first coil 26 of the read/write head 16 in the direction of the arrow in FIG. 1. Then, upon nonconduction of the first transistor 60, the second transistor 62 will conduct, causing a current I2 to flow through the second read/write head coil 28 in the arrow marked direction. It is thus seen that the pair of coils 26 and 28 of the read/write head 16 are alternately excited in the opposite directions to write the digital data by virtue of the magnetic fluxes produced in the core 22.

Let us suppose that the disk drive of FIG. 1 had no final excitation circuit 54, with the write gate signal input line 44 connected directly to the NAND gates 50 and 52. The outputs from these NAND gates would both go high when the write gate signal went low at the moment t5, causing nonconduction through both transistors 60 and 62. Since the output from the second NAND gate 52 had been low from moment t4 to moment t5, the second coil 28 of the read/write head 16 would be excited for the last time. If the write gate signal had gone low during the period of moment t3 to moment t4, during which the output from the first NAND gate 50 had been low, the first read/write head coil 26 would have been excited for the last time. Thus, conventionally, either of the read/write head coils 26 and 28 could have been excited when the write gate signal went low, depending upon the write data signal that had been written. We have already stated the disadvantages accruing from such random excitation of the read/write head coils 26 and 28 just before the completion of writing.

Our invention eliminates the disadvantages simply by providing the final excitation circuit 54 between the write gap signal input line 44 and the pair of NAND gates 50 and 52. Being connected directly to the input line 44, the flip flop 46 is reset immediately when the write gate signal goes low at the moment t5, although the outputs from the flip flop remain unchanged in the case of FIG. 3 because they have already been in the same states as upon resetting. However, the write gate signal is delayed for the period Td by the final excitation circuit 54 prior to application to the NAND gates 50 and 52, so that the write gate signal as impressed to these NAND gates remain high until the moment t6. The NAND gates 50 and 52 can therefore respond to the outputs from the flip flop 46 until the moment t6. In the case of FIG. 3, the two inputs to the second NAND gate 52 are both high, as at (C) and (E) and in FIG. 3, with the result that its output remains low from moment t5 to moment t6, as at (G) in FIG. 3. Consequently, the second switching transistor 62 conducts during this period, causing excitation of the second read/write head coil 28.

When the delayed write gate signal goes low at the moment t6, outputs from both NAND gates 50 and 52 go high as at (F) and (G) in FIG. 3. Both read/write head coils 26 and 28 are deenergized.

Figure 4:
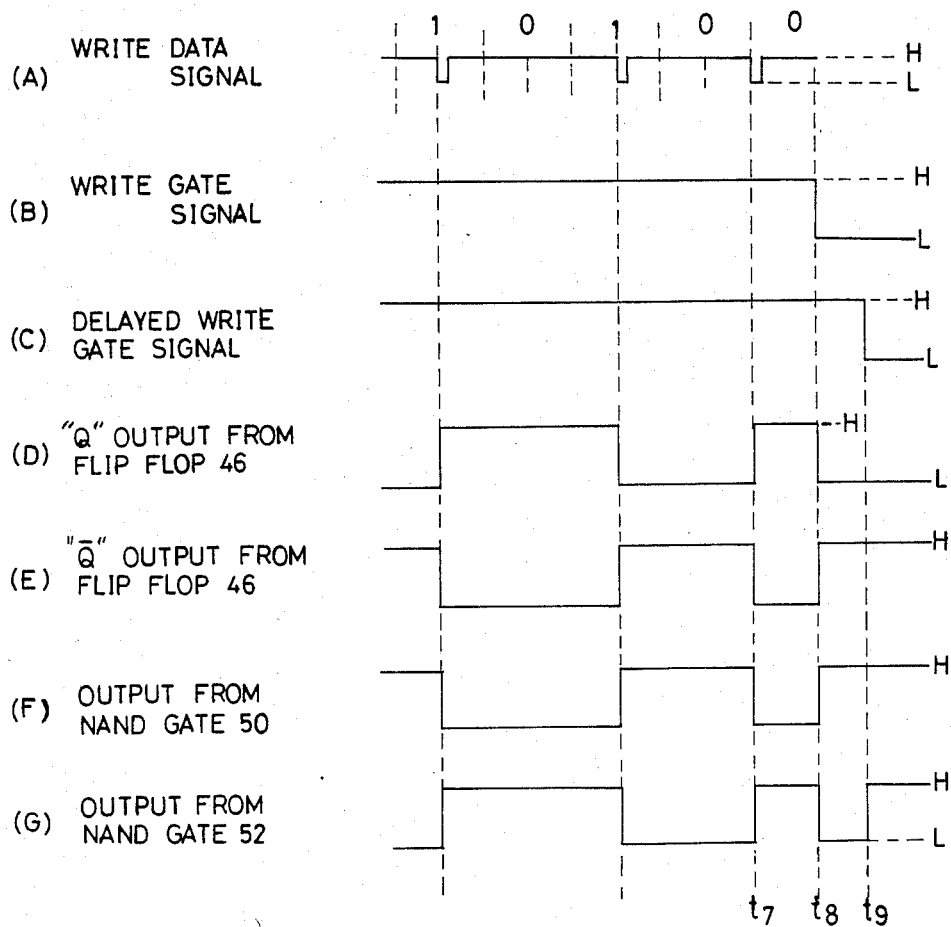
FIG. 4, consisting of (A)-(G), is also a diagram of waveforms appearing in various parts of the disk drive of FIG. 1 and useful in explaining its operation.

We have plotted in FIG. 4 a similar series of waveforms indicating a different case. At (a) in FIG. 4 is shown a write data signal representing "10100". The write gate signal is shown to go low at a moment t8, as at (B) in FIG. 4, after the "Q" output from the flip flop 46 has gone high, and the "$\overline{Q}$" output therefrom has gone low, at a previous moment t7, as at (D) and (E) in FIG. 4. Since the "Q" and "$\overline{Q}$" outputs from the flip flop 46 have been high and low, respectively, from the moment t7 in this alternative case, they go low and high, respectively, at the moment t8 when the write gate signal goes low. The delayed write gate signal remains high until a later moment t9, as at (C) in FIG. 4. Accordingly, during the period from moment t8 to moment t9, the output from the first NAND gate 50 is high, as at (F) in FIG. 4, since its two inputs are high and low, whereas the output from the second NAND gate 52 is low, as at (G) in FIG. 4, since its two inputs are both high. The low output from the second NAND gate 52 causes conduction through the second switching transistor 62, with the consequent excitation of the second read/write head coil 28.

As the delayed write gate signal goes low at the moment t9, the output from the second NAND gate 52 goes high, and the output from the first NAND gate 50 remains high. Both read/write head coils 26 and 28 are no longer excited.

It is clear from what has been herein said that the preselected one (the second coil 28 in the illustrated embodiment) of the two read/write head coils 26 and 28 is always excited upon completion of writing, regardless of the final output states of the flip flop 46. The final excitation of the second read/write head coil 28 creates in the core 22 a magnetic flux $\phi F$ in the direction of the arrow in FIG. 1. A reduction of the residual magnetism thus produced is desirable. We therefore suggest the excitation of the coils 36 of the erase heads 20 so as to create in their cores 32 magnetic fluxes $\phi E$ in the arrow marked direction opposite to the direction of the magnetic flux $\phi F$. The oppositely oriented magnetic fluxes $\phi E$ will counteract and reduce the residual magnetism of the read/write head core 22. The degree of interaction between the magnetic fluxes $\phi F$ and $\phi E$ are controllable by varying the magnitudes of the write current and erase current.

SECOND FORM

Figure 5:
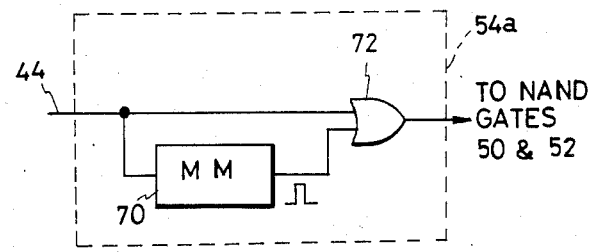
FIG. 5 is a block diagram of an alternative form of the final excitation circuit for use in the disk drive of FIG. 1.

FIG. 5 shows an alternative final excitation circuit 54a for use in the disk drive of FIG. 1 in substitution for the delay circuit 54. The alternative final excitation circuit 54a comprises a monostable multivibrator 70 connected to the write gate signal input line 44, and an OR gate 72 having an input connected directly to the write gate signal input line 44 and another input connected to the multivibrator 70. The output of the OR gate 72 is of course connected to the pair of NAND gates 50 and 52 of the write circuit 38.

The monostable multivibrator 70 puts out a pulse of the predetermined duration Td in response to the write gate signal. This output pulse of the monostable multivibrator 70 and the write gate signal are both directed into the OR gate 72, so that the output from the OR gate provides the same delayed write gate signal as that shown at (C) in FIGS. 3 and 4. It will therefore be seen that the alternative final excitation circuit 54a functions just like the final excitation circuit 54 of the FIG. 1 embodiment.

POSSIBLE MODIFICATIONS

Although we have shown and described our invention in terms of but one embodiment and a slight modification thereof, we recognize that our invention is susceptible to a variety of modifications, alterations, or adaptations within the broad teaching hereof. The following, then, is a brief list of such possible modifications:

1. As an additional example of final excitation circuit, there could be employed a retriggerable monostable multivibrator that generated pulses with a duration longer than the spacings between the data pulses to be recorded. Connected to the write data signal input line 42, the multivibrator would provide a signal akin to the delayed write gate signal shown at (C) in FIGS. 3 and 4.

2. The first coil 26, rather than the second coil 28, of the read/write head 16 could be excited upon completion of writing, all that is required being that either of the coils 26 and 28 be excited to make constant the direction of residual magnetism upon completion of writing.

3. The flip flop 46 could be a T flip flop, instead of a D flip flop.

4. AND gates could be employed in place of the NAND gates 50 and 52, and NPN transistors in place of the PNP transistors 60 and 62.

5. Digital data might be could be frequency modulated, or by some other method, rather than being modififed frequency modulated.

6. Our invention finds an application in data transfer apparatus employing magnetic tape as a record medium.

We claim:

1. In an apparatus for the transfer of digital data with a record medium such as a magnetic disk, the digital data to be written on the record medium being supplied in the form of a two level write data signal, in combination:

(a) a read/write head for writing digital data on, and reading the same from, the record medium, the read/write head comprising a magnetic core with a read/write gap, and first and second coils wound around the core to create therein magnetic fluxes in opposite directions;

(b) a write circuit for alternately exciting the first and second coils of the read/write head in response to the two level write data signal, thereby causing the coils to create magnetic fluxes in the opposite directions in the core, the write circuit being effective to excite a different one of the first and second coils of the read/write head each time the write data signal changes in level from a predetermined one to the other; and (c) a final excitation circuit connected to the write circuit to cause the same, upon completion of the writing of the write data signal, to excite a preselected one of the first and second coils of the read/write head in a prescribed direction.

2. A data transfer apparatus as set forth in claim 1, further comprising a pair of erase heads for trimming the tracks created on the record medium as the read/- write head writes digital data thereon, each erase head comprising:

(a) a second magnetic core having an erase gap; and
(b) a third coil wound around the second core so as to create therein a magnetic flux oriented to cancel the magnetic flux that is produced in the first recited core of the read/write head when the preselected one of the first and second coils thereof is excited in the prescribed direction upon completion of the writing of the write data signal.

3. In an apparatus for the transfer of digital data with a record medium such as a magnetic disk, the digital data to be written on the record medium being supplied in the form of a two level write data signal and being written thereon only when a two level write gate signal is in a first level, in combination:

(a) a read/write head for writing digital data on, and reading the same from, the record medium, the read/write head comprising a magnetic core with a read/write gap, and first and second coils wound around the core to create therein magnetic fluxes in opposite directions;
(b) a flip flop for producing two outputs of opposite levels in response to the write data signal, the two outputs from the flip flop changing in level each time the write data signal changes in level from a predetermined one to the other, the flip flop being reset by the write gate signal when the latter changes from the first to a second level;
(c) a delay circuit for delaying for a preassigned length of time the change of the write gate signal from the first to the second level;
(d) a first logic circuit having a pair of inputs connected to one output of the flip flop and to the delay circuit;
(e) a second logic circuit having a pair of inputs connected to the other output of the flip flop and to the delay circuit;
(f) direct current power supply means;
(g) a first switch connected between the first coil of the read/write head and the power supply means for on/off control therebetween in response to an output from the first logic circuit, the first switch causing the power supply means to excite the first coil of the read/write head when the two inputs to the first logic circuit are of the same level; and
(h) a second switch connected between the second coil of the read/write head and the power supply means for on/off control therebetween in response to an output from the second logic circuit, the second switch causing the power supply means to excite the second coil of the read/write head when the two inputs to the second logic circuit are of the same level;
(i) whereby the delay circuit functions to cause excitation of a preselected one of the first and second coils of the read/write head in a prescribed direction upon completion of the writing of the write data signal.

4. A data transfer apparatus as set forth in claim 3, wherein the delay circuit comprises a capacitor and a resistor.

5. A data transfer apparatus as set forth in claim 3, wherein the delay circuit comprises a monostable multivibrator for inputting the write gate signal, and an OR gate for inputting the write gate signal and the output from the monostable multivibrator.

6. A data transfer apparatus as set forth in claim 3, further comprising a pair of erase heads for trimming the tracks created on the record medium as the read/write head writes digital data thereon, each erase head comprising:

(a) a second magnetic core having an erase gap; and
(b) a third coil wound around the second core so as to create therein a magnetic flux oriented to cancel the magnetic flux that is produced in the first recited core of the read/write head when the preselected one of the first and second coils thereof is excited in the prescribed direction upon completion of the writing of the write data signal.

* * * * *